United States Patent
Liu et al.

(10) Patent No.: US 10,720,959 B2
(45) Date of Patent: Jul. 21, 2020

(54) SPREAD SPECTRUM BASED AUDIO FREQUENCY COMMUNICATION SYSTEM

(71) Applicant: British Cayman Islands Intelligo Technology Inc., Hsinchu County (TW)

(72) Inventors: Yao-Chun Liu, Hsinchu County (TW); Chun-Hung Chen, Taichung (TW); Chen-Chu Hsu, Taipei (TW); Tsung-Liang Chen, Hsinchu County (TW)

(73) Assignee: BRITISH CAYMAN ISLANDS INTELLIGO TECHNOLOGY INC., Zhubei (TW)

(*) Notice: Subject to any disclaimer, the term of this patent is extended or adjusted under 35 U.S.C. 154(b) by 0 days.

(21) Appl. No.: 16/147,955

(22) Filed: Oct. 1, 2018

(65) Prior Publication Data
US 2019/0115948 A1 Apr. 18, 2019

Related U.S. Application Data

(60) Provisional application No. 62/582,337, filed on Nov. 7, 2017, provisional application No. 62/571,298, filed (Continued)

(51) Int. Cl.
*H04B 1/713* (2011.01)
*H04B 11/00* (2006.01)
(Continued)

(52) U.S. Cl.
CPC .............. *H04B 1/713* (2013.01); *H04B 1/707* (2013.01); *H04B 11/00* (2013.01); *H04J 13/0003* (2013.01)

(58) Field of Classification Search
CPC ........ H04B 1/713; H04B 1/707; H04B 11/00; H04B 7/0678; H04B 1/10; H04J 13/0003
See application file for complete search history.

(56) References Cited

U.S. PATENT DOCUMENTS

| RE37,802 E | * | 7/2002 | Fattouche | H04B 1/707 370/209 |
| 9,006,551 B2 | * | 4/2015 | Iwase | G10H 1/40 84/615 |
| 2011/0150240 A1 | * | 6/2011 | Akiyama | H04B 1/7075 381/98 |

FOREIGN PATENT DOCUMENTS

| CN | 1249517 A | 4/2000 |
| CN | 1127225 C | 11/2003 |
| CN | 1863039 B | 3/2012 |

\* cited by examiner

*Primary Examiner* — Vineeta S Panwalkar
(74) *Attorney, Agent, or Firm* — Bacon & Thomas, PLLC (57) ABSTRACT

A spread spectrum based audio frequency communication system at least includes a transmitting apparatus. The transmitting apparatus includes a first dot-product module, a summation module, a transmitting modulation module, a mixture module, a digital-to-analog converter, and a transmitter. The first dot-product module is configured to perform a dot-product of a first data and a first pseudo-noise code, and derive a first spreading data. The summation module is configured to sum up the first spreading data and a second spreading data to form a summed data. The transmitting modulation module is configured to vary a carrier signal with the summed data to form a modulated signal. The mixture module is configured to mix the modulated signal and an acoustic signal up to form a mixed signal. The digital-to-analog converter is configured to convert the mixed signal into acoustic waves. The transmitter transmits the acoustic waves.

16 Claims, 11 Drawing Sheets

Related U.S. Application Data on Oct. 12, 2017, provisional application No. 62/571,295, filed on Oct. 12, 2017.

(51) Int. Cl.
*H04B 1/707* (2011.01)
*H04J 13/00* (2011.01)

SPREAD SPECTRUM BASED AUDIO FREQUENCY COMMUNICATION SYSTEM

CROSS REFERENCE TO RELATED APPLICATION

This application claims the benefit of filing date of U.S. Provisional Application Ser. No. 62/582,337, entitled "Spread Spectrum Based Audio Frequency Communication System" filed Nov. 7, 2017 under 35 USC § 119(e)(1).

This application claims the benefit of filing date of U. S. Provisional Application Ser. No. 62/571,298, entitled "Virtual Grouping And Multi-Beamfonner" filed Oct. 12, 2017 under 35 USC § 119(e)(1).

This application claims the benefit of filing date of U.S. Provisional Application Ser. No. 62/571,295, entitled "Voice Band Signaling for Distance Detection" filed Oct. 12, 2017 under 35 USC § 119(e)(1).

BACKGROUND OF THE INVENTION

1. Field of the Invention

The present invention relates to a wireless communication system and, more particularly, to a spread spectrum based audio frequency communication system and an audio band signaling system for distance detection.

2. Description of Related Art

The most common wireless technology uses radio waves, which belong to electromagnetic waves within spectrum from 3 Hz to 3 THz. A traditional wireless communication system requires radio frequency (RF) modules for signal transmission. The RF modules typically incorporate a printed circuit board, transmit or receive circuit, antenna, and serial interface for communication to the host processor. The manufacturing of the RF modules causes additional bills of materials (BOM) cost.

In other aspect, there are different wireless communication protocols, which are incompatible with each other. For example, it is difficult to build a communication among smartphones, home entertainments and wearables with a single protocol. The diversity of the protocols limits the application of machine to machine (M2M) communication.

Therefore, it is desirable to provide an improved wireless communication system to mitigate and/or obviate the aforementioned problems.

SUMMARY OF THE INVENTION

The present invention introduces a "whistle technology", which allows transferring data signals in audio band. Various intrinsic properties of acoustic waves may be combined with the data signals carried therein, thereby realizing various useful applications.

Most of devices already have speakers and/or microphones adapted to the whistle technology according to the present invention, and thus do not require RF modules for wireless communication. A cost effective wireless communication can therefore be achieved.

In a first aspect, the present invention provides a spread spectrum based audio frequency communication system at least including a transmitting apparatus. The transmitting apparatus includes a first dot-product module, a summation module, a transmitting modulation module, a mixture module, a digital-to-analog converter, and a transmitter. The first dot-product module is configured to perform a dot-product of a first data and a first pseudo-noise (PN) code, and derive a first spreading data. The summation module is configured to sum up the first spreading data and a second spreading data to form a summed data. The transmitting modulation module is configured to vary a carrier signal with the summed data to form a modulated signal. The mixture module is configured to mix the modulated signal and an acoustic signal to form a mixed signal. The digital-to-analog converter is configured to convert the mixed signal into acoustic waves. The transmitter transmits the acoustic waves.

Preferably, the transmitting apparatus is adapted to be paired with a receiving apparatus with a complementary structure.

Similarly, the transmitting apparatus may further include a second dot-product module configured to perform a dot-product of a second data and a second PN code, and derive the second spreading data. Optionally, the first PN code and the second PN code are chosen to be orthogonal to each other.

Preferably, the acoustic signal carries voice or audio in digital form.

Preferably, the transmitter is a speaker with beamforming capability in a speaker array.

Preferably, the acoustic waves have data component and voice/audio component, and the data component appears as a background noise of the voice/audio component.

In a second aspect, the present invention provides a spread spectrum based audio frequency communication system at least including a receiving apparatus. The receiving apparatus includes a receiver, an analog-to-digital converter, a receiving modulation module, and a first dot-product module. The receiver receives acoustic waves. The analog-to-digital converter is configured to convert the acoustic waves into a mixed signal. The receiving modulation module is configured to recover summed data from the mixed signal with a carrier signal. The first dot-product module is configured to perform a dot-product of the summed data and a first pseudo-noise (PN) code, and derive a first data.

Accordingly, the data component of the acoustic waves is derived. While, in order further to derive the voice/audio component of the acoustic waves, the receiving apparatus may further includes an interference cancellation module, a delay module, and a mixture module. The interference cancellation module is configured to generate an interference signal from the first data. The delay module is configured to delay the mixed signal to form a delayed signal. The mixture module is configured to subtract the interference signal from the delayed signal to derive an acoustic signal.

Similarly, the receiving apparatus may further include a second dot-product module configured to perform a dot-product of the summed data and a second PN code, and derive a second data.

Preferably, the receiving apparatus is adapted to be paired with a transmitting apparatus with a complementary structure.

Preferably, the receiver is a microphone with beamforming capability in a microphone array. Moreover, the microphone array may have a plurality of virtual groups in term of different functions. Furthermore, the virtual groups may include a first group used to receive beam from a direction, a second group used to receive beam from another direction, and a third group used for noise estimation and/or reduction.

Preferably, the receiving modulation module is a demodulator.

In addition, a plurality of the same spread spectrum based audio frequency communication systems may form an ad-hoc network, and any spread spectrum based audio frequency communication system may serve as a node thereof.

In a third aspect, the present invention provides an audio band signaling system for distance detection including a transmitting apparatus and a receiving apparatus.

The transmitting apparatus includes a spreading module, a mixture module, and a transmitter. The spreading module is configured to modulate a detecting signal S(t) with a high-bandwidth pseudo random binary sequence (PRBS), and output a spread signal. The mixture module is configured to mix the spread signal and an acoustic signal up to form mixed acoustic waves. The transmitter transmits the mixed acoustic waves.

The receiving apparatus includes a receiver, a de-spreading module, and a detection module. The receiver receives the mixed acoustic waves. The de-spreading module is configured to demodulate the mixed acoustic waves with the same PRBS, and return it to the detecting signal S(t). The detection module is configured to detect and analyze the detecting signal S(t).

Moreover, the transmitting apparatus may further include an extra-processing module as a bypass module or a domain transform module, and the receiving apparatus may further include another extra-processing module as another bypass module or another domain transform module.

Preferably, the detecting signal S(t) includes identity information, time information, or other properties helpful to distance detection. In addition, different mixed acoustic waves used to detect different objects at same time are distinguished by the identity information.

Other objects, advantages, and novel features of the invention will become more apparent from the following detailed description when taken in conjunction with the accompanying drawings.

DETAILED DESCRIPTION OF THE PREFERRED EMBODIMENT (Whistle Technology)

The present invention provides a "whistle technology" in wireless communication. The whistle technology aims to transfer signals through audio band. It uses spread-spectrum techniques for signal modulation and/or demodulation, and the spread signal sounds like background noise.

The whistle technology can leverage the existing audio/voice interface, for example, by using a speaker as a transmitter, and using a microphone as a receiver, which both commonly exist in a smart device. Thus, it does not need an RF antenna or a dedicated wireless communication circuit. The whistle technology may be enabled by either a software program of audio and/or voice drivers or a high-level application program (APP), and it may be built in a terminal device or on a cloud server.

When there are multiple users, the code division multiple access (CDMA) technology may be introduced into the whistle technology according to the present invention. The CDMA technology can assign an orthogonal pseudo-random code to each user.

(Spread Spectrum Based Audio Frequency Communication System)

Figure 1:
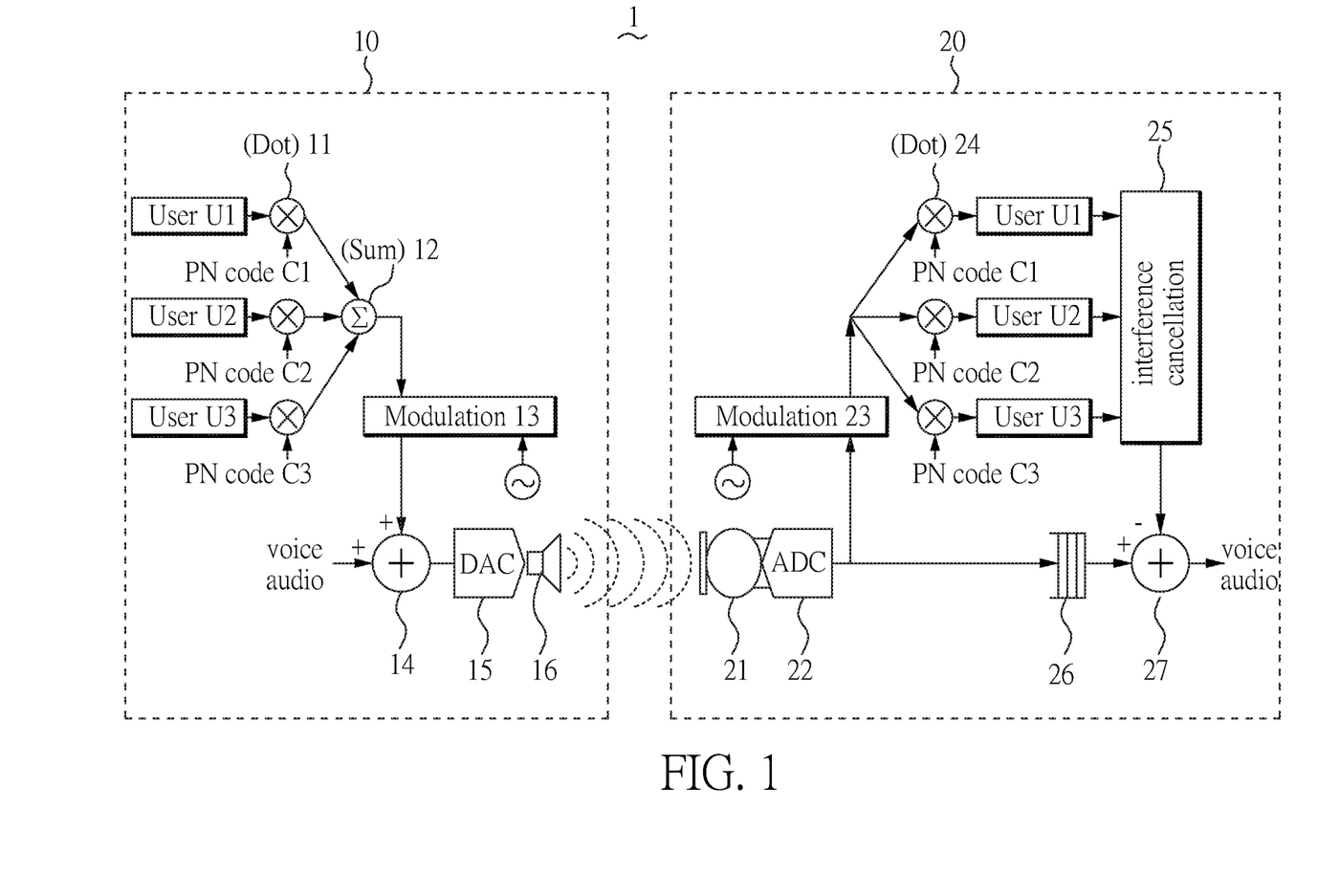
FIG. 1 shows a block diagram of the spread spectrum based audio frequency communication system according to the present invention.

FIG. 1 shows a block diagram of the spread spectrum based audio frequency communication system 1 according to the present invention.

The spread spectrum based audio frequency communication system 1 includes a transmitting apparatus 10 and a receiving apparatus 20. However, some devices may have only one of the transmitting apparatus 10 and the receiving apparatus 20, depending on their hardware support.

According to the first aspect of the present invention, the transmitting apparatus 10 includes at least one dot-product module 11 (three dot-product module are shown in this case), a summation module 12, a transmitting modulation module 13, a mixture module 14, a digital-to-analog converter (DAC) 15, and a transmitter 16.

Each dot-product module 11 receives data given by a user and a pseudo-noise (PN) code, performs a dot-product of the data and the PN code, derives a dot-product result as a spreading data (see FIG. 2), and sends the spreading data to the summation module 12.

Three dot-product modules 11 are illustratively shown in FIG. 1. In the case of FIG. 1, the top dot-product module 11 performs a dot-product of a user U1's data and a PN code C1, the middle dot-product module 11 performs a dot-product of a user U2's data and a PN code C2, and the bottom dot-product module 11 performs a dot-product of a user U3's data and a PN code C3. The PN codes may be chosen to be orthogonal to each other, that is, for any two of the PN codes, their inner product is zero.

Figure 2:
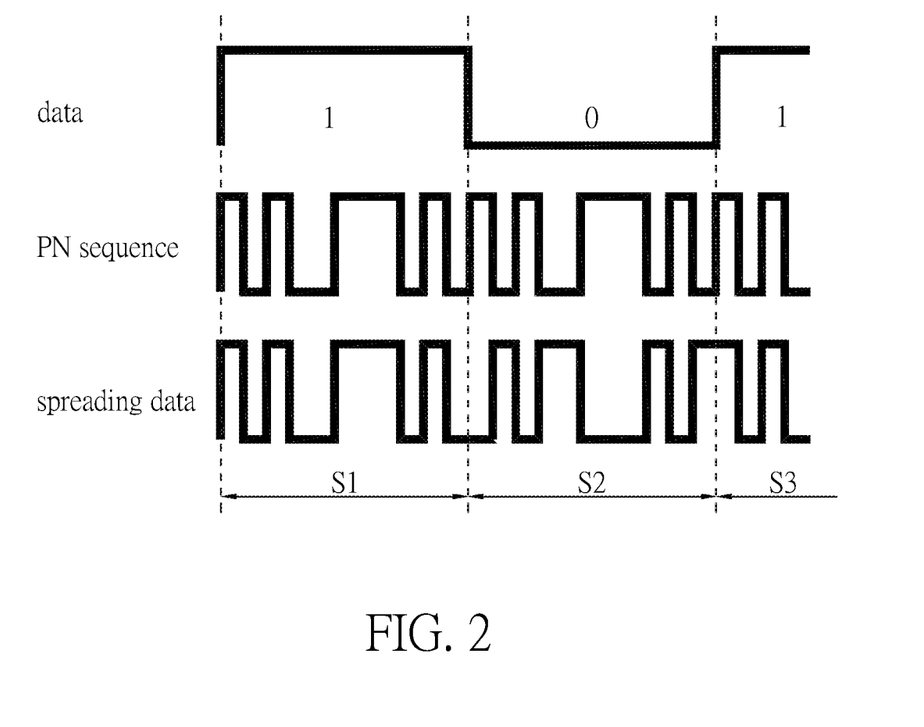
FIG. 2 shows an example of a spreading data derived by a dot-product of data given by a user and a PN sequence (i.e. a PN code)

FIG. 2 shows an example of a spreading data derived by a dot-product of data given by a user and a PN sequence (i.e. a PN code).

As shown in FIG. 2, a first spreading data section S1 is the same as a first PN code section when performing a dot-product with a data bit "logic 1". A second spreading data section S2 is the inverse of a second PN code section when performing a dot-product with a data bit "logic 0". A third spreading data section S3 is the same as a third PN code section when performing a dot-product with a data bit "logic 1".

It should be noted that "logic 0" in this specification is defined such that the dot-product of a sequence and "logic 0" is the inverse of the sequence rather than a "ground" (zero-amplitude) signal. In some other articles, "logic 0" may be represented as "logic −1".

Referred back to FIG. 1, the summation module 12 sums up the spreading data from the least one dot-product module 11 to form a summed data. The summed data is then sent to the transmitting modulation module 13.

The transmitting modulation module 13 varies a carrier signal with the summed data to form a modulated signal.

The mixture module 14 receives the modulated signal and an acoustic signal, and mixes them up to form a mixed signal. The acoustic signal may carry (or generally be associated with) voice, such as a speech, or audio, such as a music, or the combination of them, in digital form.

The DAC 15 converts the mixed signal into acoustic waves.

Finally, the acoustic waves are sent by the transmitter 16. The transmitter 16 may be a speaker, for example.

It is appreciated that, the acoustic waves can be regarded as having two components: the data component and the voice/audio component. The data component is obtained from a pseudo-randomization process, so it appears as a background noise of the voice/audio component, and people are expected not to be aware of the data component.

It is also noted that the term "acoustic waves" and the term "acoustic signal" have different meanings.

Figure 3:
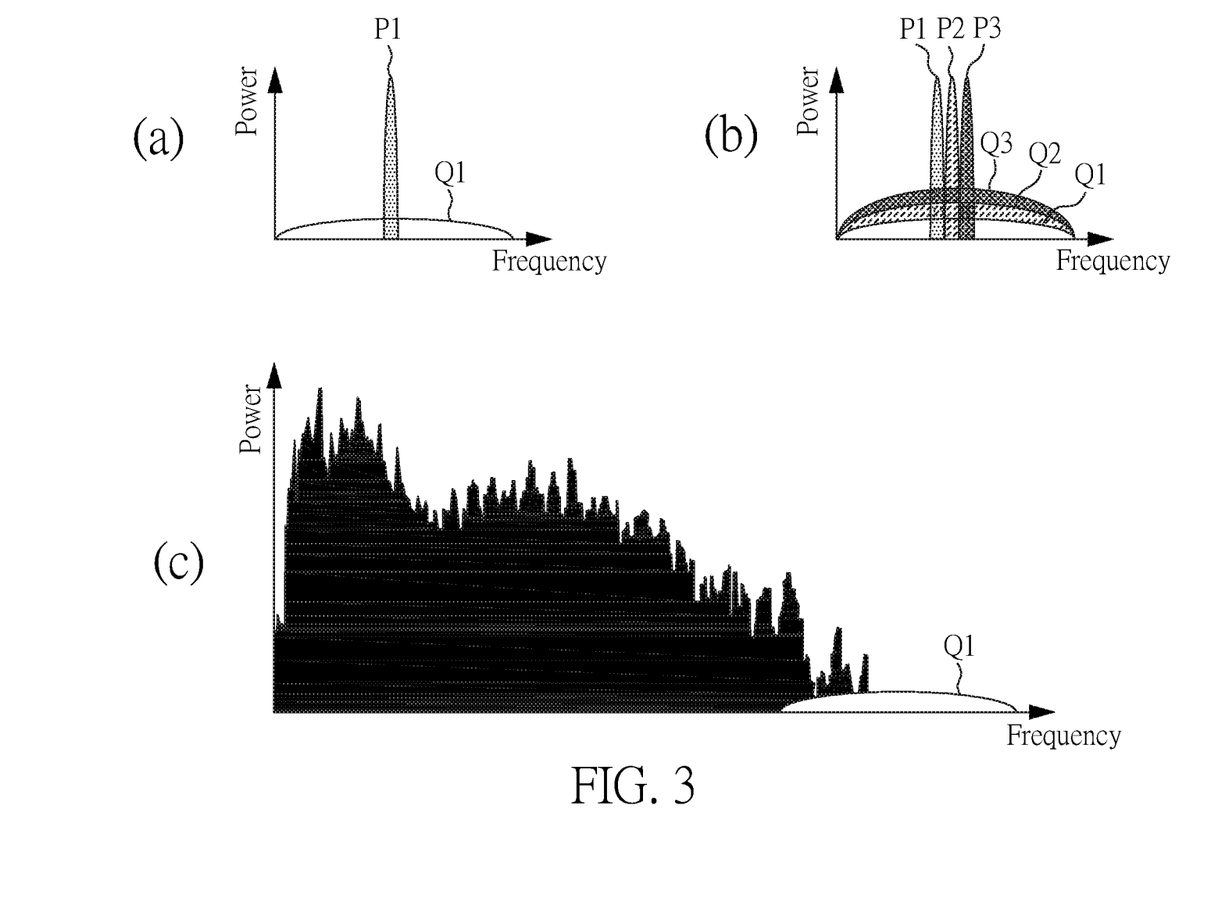
FIG. 3 illustratively shows three spectrum diagrams.

FIG. 3 illustratively shows three spectrum diagrams, wherein power may be measured in unit of Watt, and frequency may be measured in unit of Hz. The spectrum diagram (a) shows an original spectrum P1 of the user U1's data and its spreading data Q1. The spectrum diagram (b) shows three original spectrums P1, P2, P3 of the users U1, U2, U3's data and their spreading data Q1, Q2, Q3, respectively. The spectrum diagram (c) shows the spreading data Q1 appearing as the background noise in environment.

Accordingly, the transmitting apparatus 10 can communicate with the receiving apparatus 20 by transferring data signals in audio band.

On the other hand, the receiving apparatus 20 is preferably paired with the transmitting apparatus 10. According to the second aspect of the present invention, the receiving apparatus 20 includes a receiver 21, an analog-to-digital converter (ADC) 22, a receiving modulation module 23, and at least one dot-product module 24 (three dot-product module are shown in this case). The receiving apparatus 20 may further include an interference cancellation module 25, a delay module 26, and a mixture module 27.

The acoustic waves are received by the receiver 21. The receiver 21 may be a microphone, for example.

The ADC 22 converts the acoustic waves into the mixed signal. The mixed signal is then sent via two paths.

In one path, the receiving modulation module 23 recovers the summed data from the mixed signal with the carrier signal. In some cases, the receiving modulation module 23 may also be regarded as a demodulator.

Each dot-product module 24 receives the summed data and the PN code, performs a dot-product of the summed data and the PN code, and derives the original data given by the user at the transmitting apparatus 10. The dot-product module 24 may be the same as the dot-product module 11.

Three dot-product modules 24 are illustratively shown in FIG. 1. In the case of FIG. 1, the top dot-product module 24 performs a dot-product of the summed data and the PN code C1 to derive the user U1's data, the middle dot-product module 24 performs a dot-product of the summed data and the PN code C2 to derive the user U2's data, and the bottom dot-product module 24 performs a dot-product of the summed data and the PN code C3 to derive the user U3's data. Accordingly, the receiving apparatus 20 successfully derives all the data sent from the transmitting apparatus 10. As previously mentioned, in some cases, the PN codes may be chosen to be orthogonal to each other.

Herein, the received user data is said to be the same as the transmitted user data in term of digital (e.g. binary) form, but one may be a multiple of another in term of analog form.

There may be the voice/audio component to be recovered from the acoustic waves. Therefore, the mixed signal is also sent via another path associated with the cancellation module 25, the delay module 26, and the mixture module 27.

The cancellation module 25 generates an interference signal from the user data.

The delay module 26 may be a first in first out (FIFO) buffer. The delay module 26 receives and delays the mixed signal to form a delayed signal so that the delayed signal can be synchronized with the interference signal for calculation in the mixture module 27.

The mixture module 27 receives the delayed signal and the interference signal, and subtract (or remove) the interference signal from the delayed signal to derive the acoustic signal, which may be the (speech) voice, the (music) audio, or the combination of them. In FIG. 1, the plus symbol (+) near the mixture module 27 means that the interference signal turns into positive value, and the minus symbol (−) near the mixture module 27 means that the delayed signal turns into a negative value.

Finally, the two components: the data component and the voice/audio component in the acoustic waves are both received and recovered by the receiving apparatus 20. Therefore, the spread spectrum based audio frequency communication system 1 according to the present invention allows data transmission and/or reception along with sound (i.e. in audio band).

It is to be understood that the aforementioned modules of the present invention can be carried out in any desired and suitable manner. For example, they can be implemented in hardware or software. Unless otherwise indicated, the various functional elements, stages and means of the present invention may include a suitable processor, a controller, a functional unit, a circuitry, a processing logic, a microprocessor arrangement, and so on, that are operable to perform the functions. There may be a dedicated hardware element and/or programmable hardware element that can be configured to operate in desired and suitable manners.

(Beamforming Over Whistle)

Figure 4:
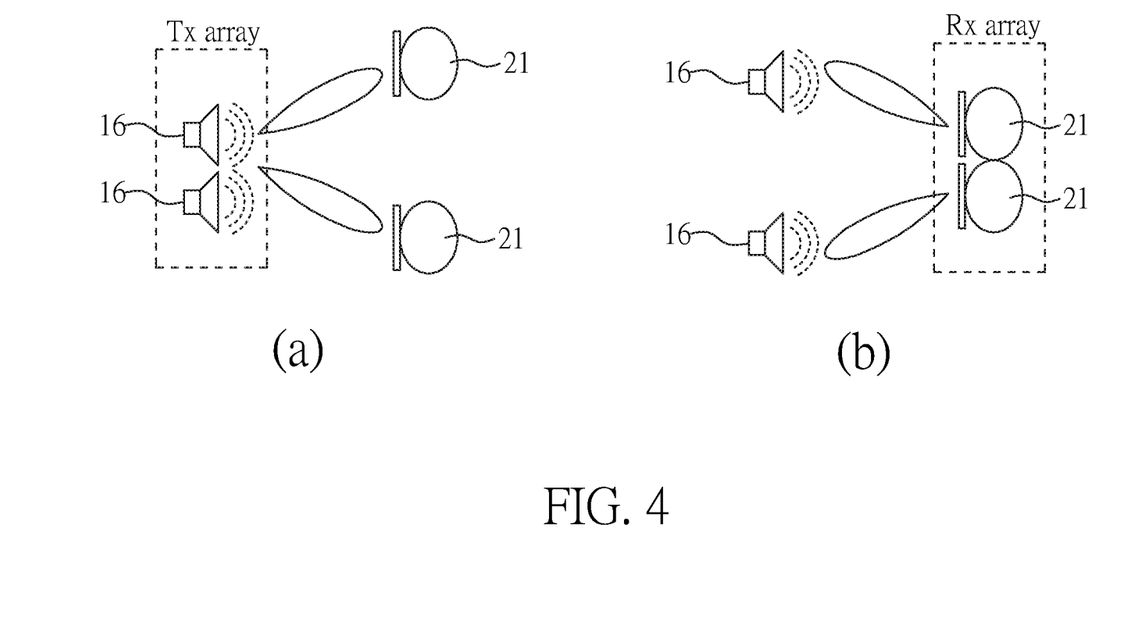
FIG. 4 shows two examples of beamforming technology incorporated into the spread spectrum based audio frequency communication system according to the present invention.

FIG. 4 shows two examples of beamforming technology incorporated into the spread spectrum based audio frequency communication system 1 according to the present invention. FIG. 4 only shows the transmitters 16 and the receivers 21 to respectively represent the transmitting apparatus 10 and the receiving apparatus 20 of the spread spectrum based audio frequency communication system 1 for illustrative purpose.

The transmitter 16 may be provided with beamforming capability to generate directional beam pattern. For example, as shown in example (a) of FIG. 4, a transmitter array including two adjacent transmitters 16 is assigned to transmit acoustic waves to two distanced receivers 21. In this case, the beamforming is preferably applied to acoustic waves so that the acoustic waves transmitted from the receiver array can be separated into two directional waves respectively toward the two distanced receivers 21.

The receiver 21 may be provided with beamforming capability for signal quality improvement, interference cancellation, and/or transmitter direction estimation. For example, as shown in example (b) of FIG. 4, two distanced transmitters 16 respectively transmit two acoustic waves to a receiver array including two adjacent receivers 21. In this case, the beamforming is preferably applied to the two acoustic waves received from the two distanced transmitters 16 so that one of them can be clearly distinguish from the other of them.

Figure 5:
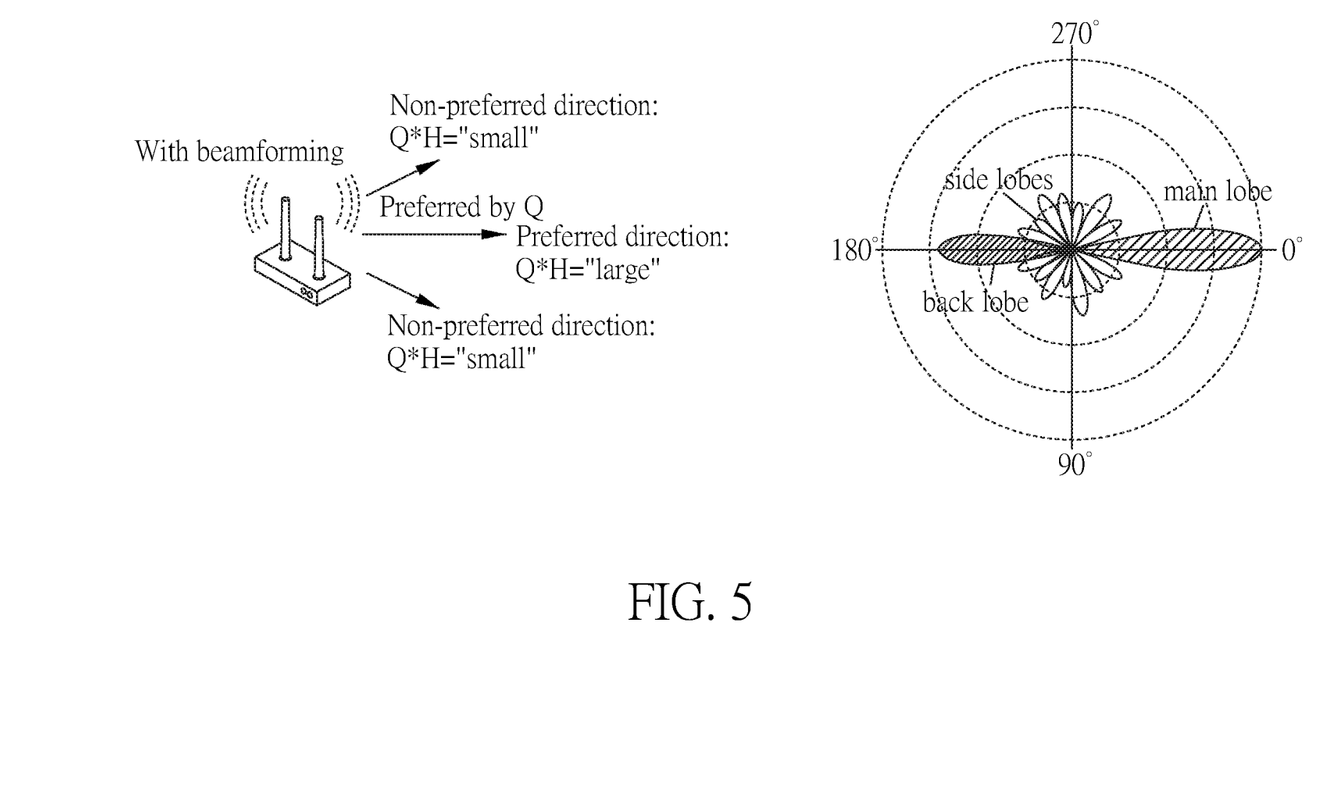
FIG. 5 shows design factors for beamforming and a polar diagram of the acoustic waves.

In some embodiments, space-time coding may be applied to the acoustic waves for signal-to-noise ratio (SNR) enhancement FIG. 5 shows design factors for beamforming and a polar diagram of the acoustic waves, wherein the radial distance from the center represents field strength of the acoustic waves.

A main lobe, a back lobe, and a plurality of side lobes are shown in FIG. 5. The main lobe is a lobe in a preferred direction, and it is designed to have highest field strength by giving it with a larger Q×H value, wherein Q represents a receiver array vector and H represents a beamforming coefficients vector. The side lobes are lobes in non-preferred directions, the back lobe is a specific side lobe in an opposite direction from the main lobe, and they are designed to have lower field strength by giving them with smaller Q×H value.

(Virtual Grouping Over Whistle)

Typical microphone array is used to track one acoustic source.

However, in the present invention, the receiver array can be designed in a linear or circular arrangement. The receivers 21 in the array are divided into a plurality of virtual groups. Each receiver 21 can have different functions, such as beamforming, noise estimation and reduction, direction of arrival (DoA) estimation, and/or range estimation.

In addition, the receivers 21 in one group may not be physically adjacent to each other. In other words, they are grouped in term of their functions rather than their locations, so the grouping is called "virtual grouping".

Each virtual group divided from the receiver array may be regarded as a beamformer that traces beam (e.g. directional acoustic waves) from a desired direction. A multi-beamformer for tracing different desired directions may be realized with a plurality of virtual groups. The direction referred herein may be directions within a small range rather than one direction along one line.

Figure 6:
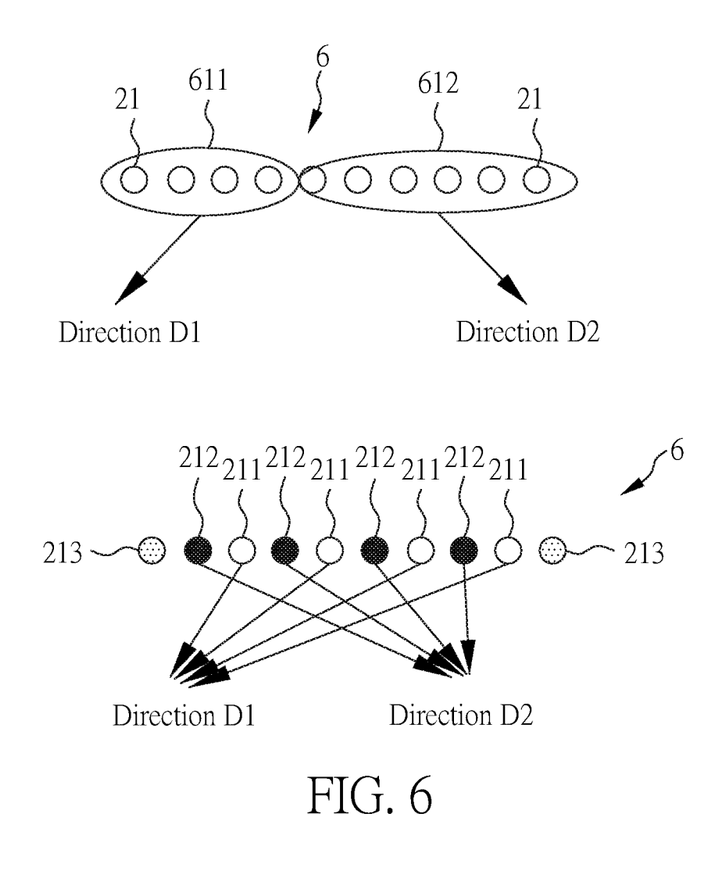
FIG. 6 shows two examples of virtual grouping of the receiver array for the spread spectrum based audio frequency communication system according to the present invention.

FIG. 6 shows two examples of virtual grouping of the receiver array for the spread spectrum based audio frequency communication system 1 according to the present invention.

Example (a) of FIG. 6 shows a receiver array 6 in a linear arrangement, the receiver array 6 is divided into two groups 611 and 612, the first group 611 is used to receive beam from a direction D1, and the second group 612 is used to receive beam from another direction D2.

Example (b) of FIG. 6 shows a receiver array 6 in a linear arrangement, the receiver array 6 is divided into three groups: a first group including receivers 211 represented by white color is used to receive beam from a direction D1, a second group including receivers 212 represented by black color is used to receive beam from another direction D2, a third group including receivers 213 represented by dot pattern is used for noise estimation and reduction, and thus the receivers 213 are preferably arranged in edges of the receiver array.

With the virtual grouping according to the present invention, receivers in the same group can be widely distributed in space and support each other to avoid dead zone.

(MIMO Technology Over Whistle)

Figure 7:
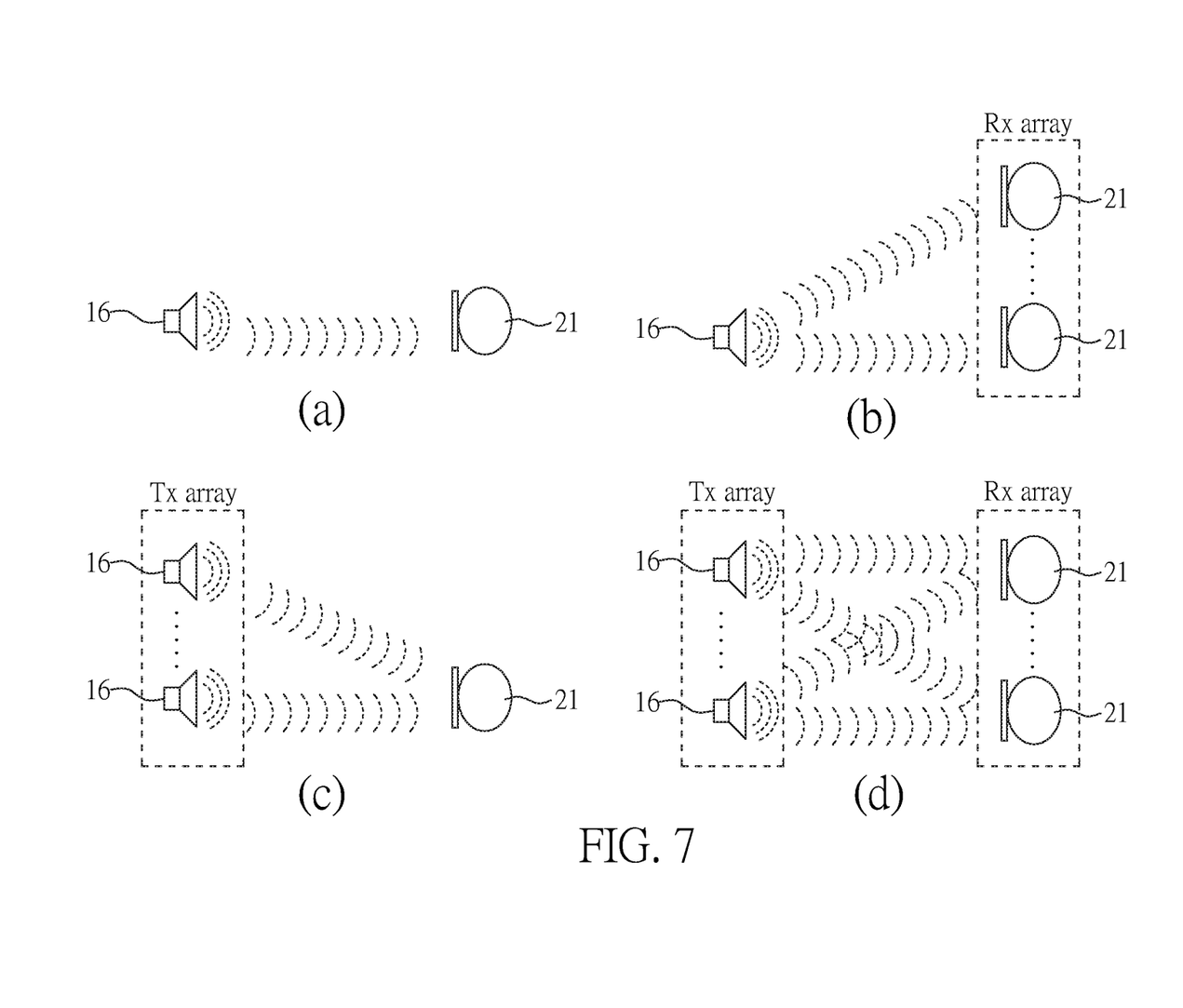
FIG. 7 shows several examples of multi-input multi-output (MIMO) technology incorporated into the spread spectrum based audio frequency communication system according to the present invention.

FIG. 7 shows several examples of multiple input multiple output (MIMO) technology incorporated into the spread spectrum based audio frequency communication system 1 according to the present invention. FIG. 7 only shows the transmitters 16 and the receivers 21 to respectively represent the transmitting apparatus 10 and the receiving apparatus 20 of the spread spectrum based audio frequency communication system 1 for illustrative purpose.

In these cases, the transmitters 16 may be speakers, and they may form a speaker array; the receivers may be microphones, and they may form a microphone array, so as to enable the MIMO capability between the transmitting apparatus 10 and the receiving apparatus 20.

In FIG. 7, example (a) shows a one-to-one case, example (b) shows a many-to-one case, example (c) shows a one-to-many case, and example (d) shows a many-to-many case.

With the MIMO technology according to the present invention, the transmitter array can transmit one whistle command to simultaneously control multiple receiving apparatuses 20. In other hand, the receiver array can simultaneously receive multiple whistle commands from multiple receiving apparatuses 20, and operate according to those whistle commands.

It is appreciated that, the "whistle technology" can be combined with any or all of the "beamforming", the "virtual grouping", and the "MIMO technology" depending on practical application.

(Ad-Hoc Network Over Whistle)

An ad-hoc network is a decentralized type of wireless network. It does not rely on a pre-existing infrastructure. Instead, each node participates in routing by forwarding data for other nodes.

Figure 8:
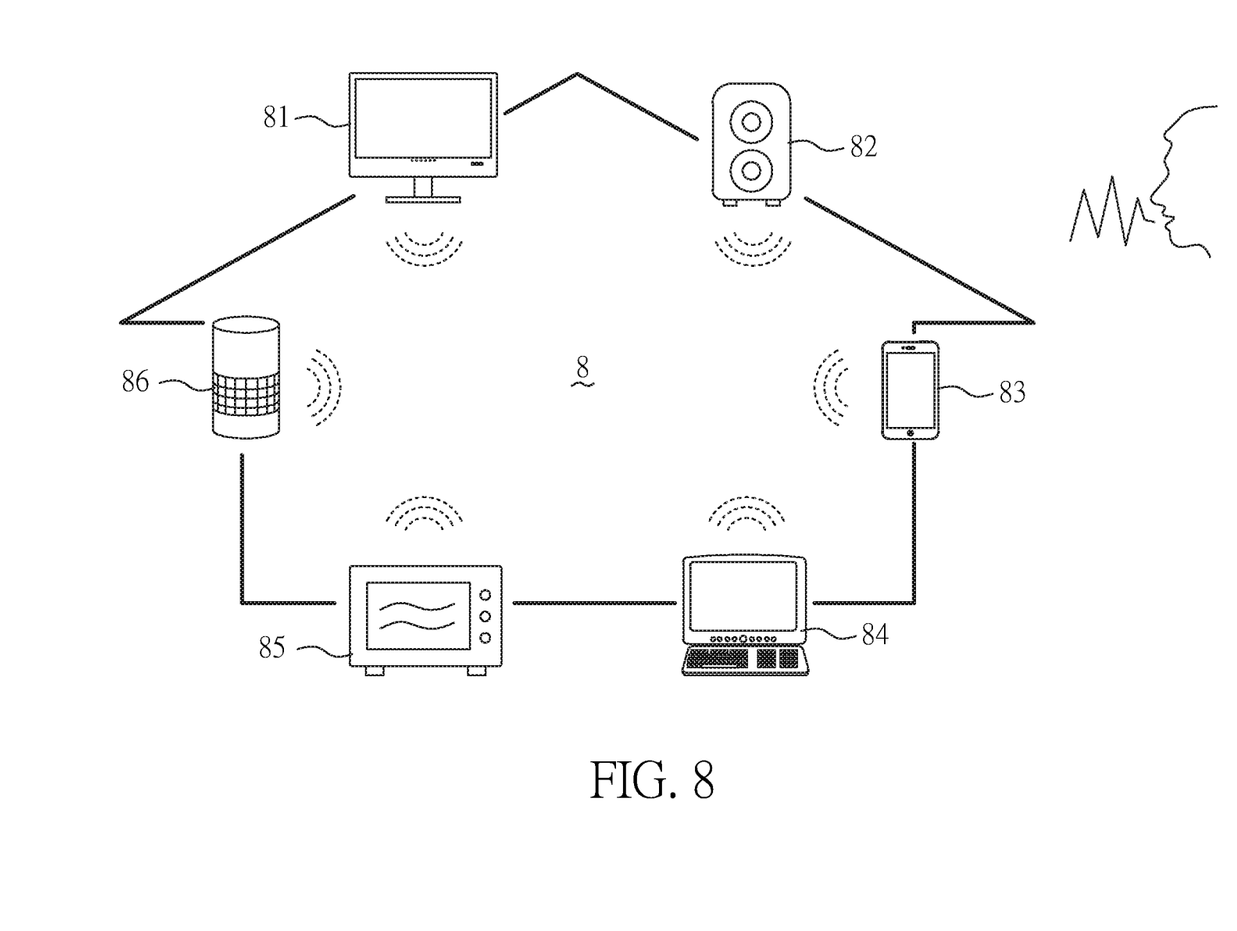
FIG. 8 shows a schematic diagram of the whistle ad-hoc network according to the present invention.

FIG. 8 shows a schematic diagram of the whistle ad-hoc network 8 according to the present invention.

The whistle ad-hoc network 8 includes a plurality of whistle-enabled devices, such as a computer 81, a speaker 82, a smartphone 83, a tablet 84, a smart television 85, and a home entertainment 86. Other Internet of thing (IoT) devices may also participate in the ac-hoc network 8. Each whistle-enabled device is equipped with the spread spectrum based audio frequency communication system 1 (as shown in FIG. 1).

The whistle ad-hoc network according to the present invention provides a low cost solution for IoT applications because it is not necessary to construct an intranet by a wired or wireless router. Each whistle-enabled device in the whistle ad-hoc network can work as a router for (data) packet forwarding. The whistle ad-hoc network can be easily expanded or contracted. It is easy to add or remove any device in the whistle ad-hoc network.

In addition, the whistle technology according to the present invention allows transferring data in audio band. Any device having an acoustic transmitter (e.g. speaker) and an acoustic receiver (e.g. microphone) can participate in the whistle ad-hoc network without dedicated RF modules (e.g. antenna) adapted for electromagnetic waves.

With the whistle ad-hoc network according to the present invention, various sensors from various devices can be associated, and it enables sensor fusion for data exchanging and management in different scenarios. For example, in a scenario for "home", kitchen equipment or bathroom equipment may transmit temperature data or moisture data to a computer easily by their speakers. In a scenario for "traffic", a vehicle may send measured traffic data to a traffic center easily by its horn.

Echolocation, sonic-vision, proximity or near-field communication, remote whistle command, time synchronization protocol for time synchronization among devices, and other applications may be applicable with the whistle technology according to the present invention.

Figure 9:
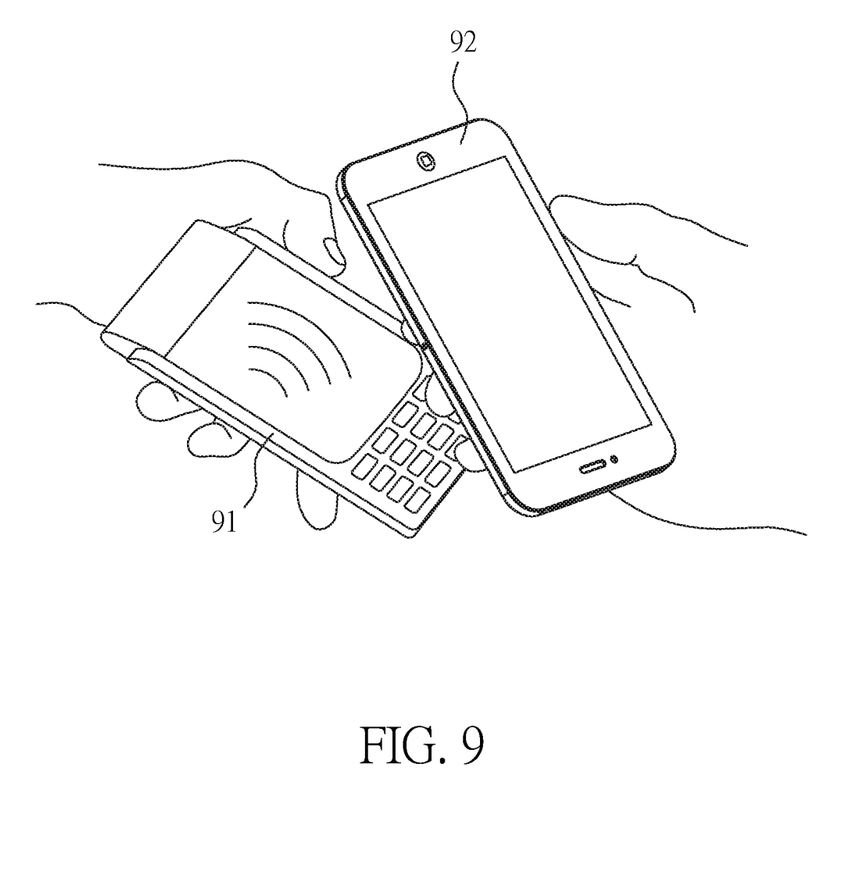
FIG. 9 shows a proximity communication between two whistle-enabled devices.

FIG. 9 shows a proximity communication between two whistle-enabled devices 91 and 92.

(Audio Band Signaling for Distance Detection)

The spread spectrum based audio frequency communication system 1 (as shown in FIG. 1) according to the present invention may use regular (i.e. conventional) speaker and microphone as the transmitter 16 and the receiver 21. They operate in an acoustic frequency band of 0 Hz to 20 KHz. The regular speaker and microphone are readily available and cost effective.

The same speaker-microphone pair can be used for normal audio/voice applications and distance detection simultaneously, which means, the speaker can send data without stopping audio/voice, and the microphone can receive the data along with the audio/voice.

According to the third aspect of the present invention, there is provided an audio band signaling system 3, which may be used in distance detection. The audio band signaling system is an alternative form of the spread spectrum based audio frequency communication system 1 (as shown in FIG. 1).

Figure 10:
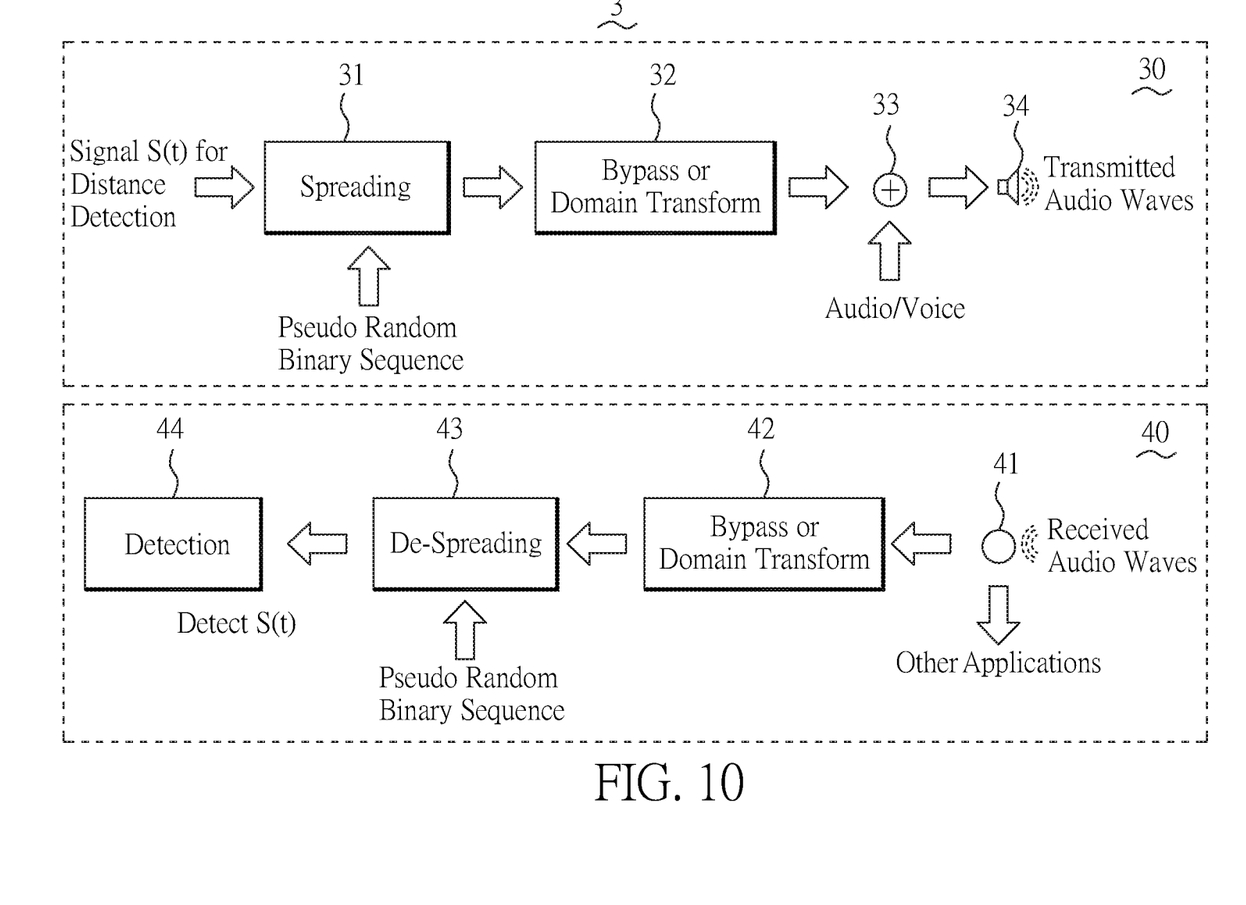
FIG. 10 shows a block diagram of the audio band signaling system according to the present invention.

FIG. 10 shows a block diagram of the audio band signaling system 3 according to the present invention.

The audio band signaling system 3 includes a transmitting apparatus 30 and a receiving apparatus 40.

The transmitting apparatus 30 includes a spreading module 31, a mixture module 33, and a transmitter (e.g. regular speaker) 34. The transmitting apparatus 30 may optionally include an extra-processing module 32, which may be a bypass module or a domain transform module. The domain transform module may perform inverse fast Fourier transform (IFFT) module, for example.

In the spreading module 31, a signal S(t) used for distance detection is modulated by a high-bandwidth pseudo random binary sequence (PRBS) to increase the processing gain. For example, S(t) bandwidth may be 10 Hz, and PRBS bandwidth may be 16 KHz. The spreading module 31 then outputs a spread signal.

The spread signal may optionally pass through the extra-processing module 32 for additional signal processing. The extra-processing module 32 outputs an extra-processed signal. However, in some embodiments, the extra-processing module 32 may be omitted.

The spread signal is noise-like because of the modulation by the PRBS, and so is the extra-processed signal.

The mixture module 33 receives the spread signal (or the extra-processed signal) and an acoustic signal, which may be voice and/or audio waves, and mixes them up to form a mixed acoustic waves.

In this embodiment, the mixed acoustic waves are directly sent by the transmitter 34, so that it does not require a DAC.

On the other hand, the receiving apparatus 40 includes a receiver (e.g. regular microphone) 41, a de-spreading module 43, and a detection module 44. The receiving apparatus 40 may optionally include another extra-processing module 32, which may be a bypass module or a domain transform module. The domain transform module may perform fast Fourier transform (FFT) module, for example. In some embodiments, the transform in the transmitting apparatus 30 and the transform in the receiving apparatus 40 may form a pair, one for encoding and another for decoding.

The mixed acoustic waves are received by the receiver 41, and may optionally pass through the other extra-processing module 42 for additional signal processing. The other extra-processing module 42 may convert the extra-processed signal into the spread signal. However, in some embodiments, the other extra-processing module 42 may be omitted.

The spread signal is then de-spread (or generally, demodulated) by the de-spread module 43 with the same PRBS, and returns to the signal S(t), as in the transmitting apparatus 30.

The detection module 44 detects and analyzes the signal S(t). The signal S(t) may include identity information, time information, or other properties helpful to distance detection. The distance between two objects can be calculated by the time between transmission and reception. The two objects may be two common objects, one whistle-enabled device and one common object, or two whistle-enabled devices.

Figure 11:
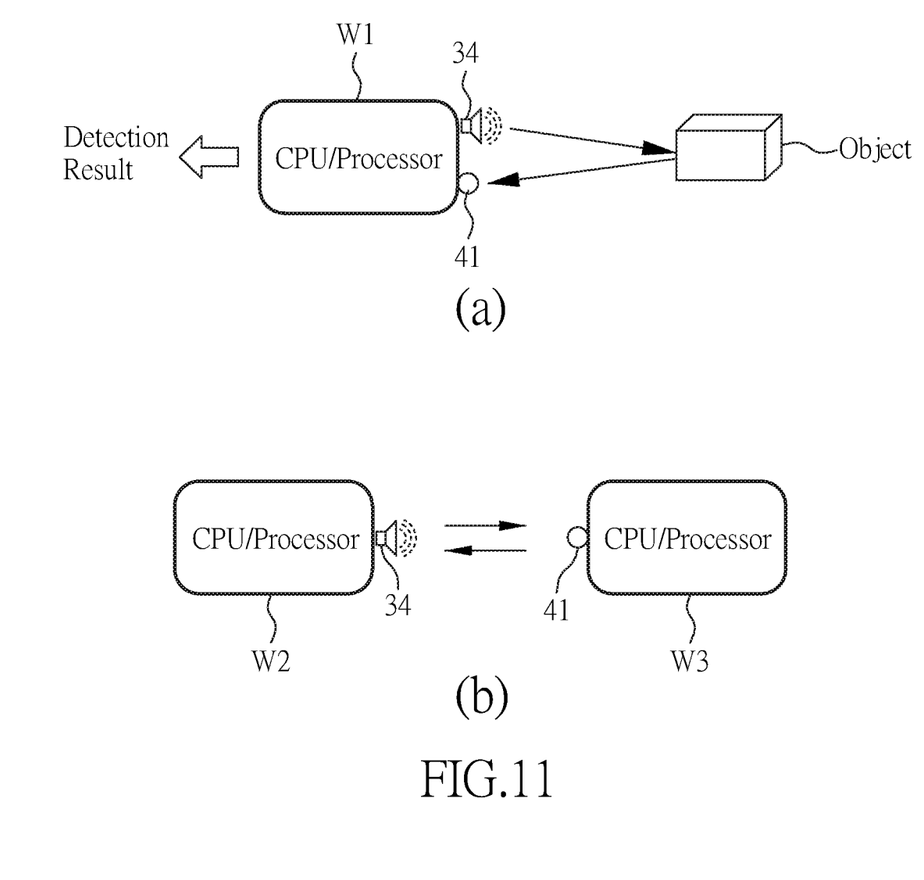
FIG. 11 shows two examples of audio band distance detection according to the present invention.

FIG. 11 shows two examples of audio band distance detection according to the present invention. Each whistle-enabled device in FIG. 11 includes the audio band signaling system 3 according to the present invention.

Example (a) of FIG. 11 shows a whistle-enabled device W1 transmits mixed acoustic waves, and receives the reflection thereof from a common object. By confirming the time between transmitting the mixed acoustic waves and receiving the reflection thereof, the distance from the whistle-enabled device W1 to the object can be calculated by a CPU or processor of the whistle-enabled device W1.

In some cases, the whistle-enabled device W1 may transmit different mixed acoustic waves to detect different objects at the same time. In these cases, in order to identify respective reflections from respective mixed acoustic waves, identity information or time information may be carried in the respective mixed acoustic waves. (As previously mentioned, space-time coding is possible.) The whistle technology according to the present invention, which allows data transmission and/or reception along audio band, is therefore important. In the prior art, different distance detection with different acoustic waves is not possible because the acoustic waves cannot be distinguished since they are pure acoustic waves without carrying data for identification. However, the present invention conquers the aforementioned problem.

It is also appreciated that electromagnetic waves cannot be used in distance detection because they travel at the speed of light, which is too fast in measurement on the earth.

Example (b) of FIG. 11 shows a whistle-enabled device W2 transmits mixed acoustic waves to another whistle-enabled device W3. Time information may be carried in the mixed acoustic waves, so that the other whistle-enabled device W3 can acknowledge the transmitting time, and derive the distance from itself to the whistle-enabled device W2. Then, the other whistle-enabled device W3 can make a response to the whistle-enabled device W2 to inform it about space-time information. In this case, it is not necessary to detect a wave reflection.

In conclusion, the present invention provides a spread spectrum based audio frequency communication system and an audio band signaling system using the "whistle technology", which allows transferring data signals in audio band. Various intrinsic properties of acoustic waves may be combined with the data signals carried therein, thereby realizing various useful applications. Most of devices already have speakers and/or microphones adapted to the whistle technology according to the present invention, and thus do not require RF modules for wireless communication. A cost effective wireless communication can therefore be achieved.

Although the present invention has been explained in relation to its preferred embodiment, it is to be understood that many other possible modifications and variations can be made without departing from the spirit and scope of the invention as hereinafter claimed.

What is claimed is:

1. A spread spectrum based audio frequency communication system, comprising:
   a transmitting apparatus, including:
   a first dot-product module configured to perform a dot-product of a first data and a first pseudo-noise (PN) code, and derive a first spreading data;
   a summation module configured to sum up the first spreading data and a second spreading data to form a summed data;
   a transmitting modulation module configured to vary a carrier signal with the summed data to form a modulated signal;
   a mixture module configured to mix the modulated signal and an acoustic signal up to form a mixed signal;
   a digital-to-analog converter configured to convert the mixed signal into acoustic waves; and
   a transmitter for transmitting the acoustic waves.

2. The spread spectrum based audio frequency communication system of claim 1, wherein the transmitting apparatus is adapted to be paired with a receiving apparatus, including:
   a receiver for receiving the acoustic waves;
   an analog-to-digital converter configured to convert the acoustic waves into the mixed signal;
   a receiving modulation module configured to recover the summed data from the mixed signal with the carrier signal; and
   another first dot-product module configured to perform a dot-product of the summed data and the first pseudo-noise (PN) code, and derive the first data.

3. The spread spectrum based audio frequency communication system of claim 1, wherein the transmitting apparatus further comprises a second dot-product module configured to perform a dot-product of a second data and a second PN code, and derive the second spreading data.

4. The spread spectrum based audio frequency communication system of claim 3, wherein the first PN code and the second PN code are chosen to be orthogonal to each other.

5. The spread spectrum based audio frequency communication system of claim 1, wherein the acoustic signal carries voice or audio in digital form.

6. The spread spectrum based audio frequency communication system of claim 1, wherein the transmitter is a speaker with beamforming capability in a speaker array.

7. The spread spectrum based audio frequency communication system of claim 1, wherein the acoustic waves have data component and voice/audio component, and the data component appears as a background noise of the voice/audio component.

8. A spread spectrum based audio frequency communication system, comprising:
   a receiving apparatus, including:
   a receiver for receiving acoustic waves;
   an analog-to-digital converter configured to convert the acoustic waves into a mixed signal;
   a receiving modulation module configured to recover summed data from the mixed signal with a carrier signal; and
   a first dot-product module configured to perform a dot-product of the summed data and a first pseudo-noise (PN) code, and derive a first data.

9. The spread spectrum based audio frequency communication system of claim 8, wherein the receiving apparatus further comprises:
   an interference cancellation module configured to generate an interference signal from the first data;
   a delay module configured to delay the mixed signal to form a delayed signal; and
   a mixture module configured to subtract the interference signal from the delayed signal to derive an acoustic signal.

10. The spread spectrum based audio frequency communication system of claim 8, wherein the receiving apparatus further comprises a second dot-product module configured to perform a dot-product of the summed data and a second PN code, and derive a second data.

11. The spread spectrum based audio frequency communication system of claim 8, wherein the receiving apparatus is adapted to be paired with a transmitting apparatus, including:
   another first dot-product module configured to perform a dot-product of the first data and the first pseudo-noise (PN) code, and derive a first spreading data;
   a summation module configured to sum up the first spreading data and a second spreading data to form the summed data;
   a transmitting modulation module configured to vary the carrier signal with the summed data to form a modulated signal;
   a mixture module configured to mix the modulated signal and an acoustic signal up to form the mixed signal;
   a digital-to-analog converter configured to convert the mixed signal into the acoustic waves; and
   a transmitter for transmitting the acoustic waves.

12. The spread spectrum based audio frequency communication system of claim 8, wherein the receiver is a microphone with beamforming capability in a microphone array.

13. The spread spectrum based audio frequency communication system of claim 12, wherein the microphone array has a plurality of virtual groups based on functions performed.

14. The spread spectrum based audio frequency communication system of claim 13, wherein the virtual groups include a first group used to receive beam from a direction, a second group used to receive beam from another direction, and a third group used for noise estimation and/or reduction.

15. The spread spectrum based audio frequency communication system of claim 8, wherein the receiving modulation module is a demodulator.

16. The spread spectrum based audio frequency communication system of claim 8, the spread spectrum based audio frequency communication system configured to serve as a node of an ad-hoc network formed of a plurality of spread spectrum based audio frequency communication systems.

* * * * *